United States Patent
Kan

(10) Patent No.: US 11,268,457 B2
(45) Date of Patent: Mar. 8, 2022

(54) OUTBOARD MOTOR

(71) Applicant: YAMAHA HATSUDOKI KABUSHIKI KAISHA, Iwata (JP)

(72) Inventor: Yoshitaka Kan, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/100,440

(22) Filed: Nov. 20, 2020

(65) Prior Publication Data
US 2021/0189976 A1 Jun. 24, 2021

(30) Foreign Application Priority Data

Dec. 19, 2019 (JP) .............................. JP2019-229515

(51) Int. Cl.
| | |
|---|---|
| *F02D 17/04* | (2006.01) |
| *F02M 35/16* | (2006.01) |
| *B63H 20/14* | (2006.01) |
| *B63H 20/24* | (2006.01) |
| *F02B 61/04* | (2006.01) |

(52) U.S. Cl.
CPC ........... *F02D 17/04* (2013.01); *F02M 35/167* (2013.01); *B63H 20/14* (2013.01); *B63H 20/245* (2013.01); *F02B 61/045* (2013.01); *F02D 2200/101* (2013.01)

(58) Field of Classification Search
CPC ... F02D 17/04; F02D 2200/101; F02M 25/16; F02M 25/167; F02B 61/045; B63H 20/14; B63H 20/245

USPC ............... 701/101, 102, 107, 110, 112, 114; 123/196 S, 198 D, 198 DB, 198 DC, 123/198 F
See application file for complete search history.

(56) References Cited

U.S. PATENT DOCUMENTS

| | | | | |
|---|---|---|---|---|
| 5,447,133 | A | * | 9/1995 | Kamio ................... F02D 11/107 123/198 F |
| 8,437,895 | B2 | * | 5/2013 | Ito ............................ B63J 99/00 701/21 |
| 9,068,517 | B2 | * | 6/2015 | Whitney ............. F02D 41/0087 |
| 2002/0065169 | A1 | * | 5/2002 | Suzuki .................. F02B 61/045 477/109 |

(Continued)

*Primary Examiner* — John Kwon
*Assistant Examiner* — Johnny H Hoang
(74) *Attorney, Agent, or Firm* — Rabin & Berdo, P.C.

(57) ABSTRACT

An outboard motor, including an engine having a cylinder containing a combustion chamber, an intake pathway connected to the combustion chamber, a piston disposed in the cylinder, a crankshaft connected to the piston, a fuel injection device connected to the intake pathway, and an ignition device connected to the combustion chamber. The outboard motor further includes a controller that is configured to receive a signal indicating an engine speed from a sensor, control the fuel injection device to suspend fuel supply and control the ignition device to suspend ignition, upon determining that the engine is in an over-revolution state, control the fuel injection device to release the suspension of the fuel supply upon determining that the engine has recovered from the over-revolution state, and control the ignition device to release the suspension of the ignition after lapse of a number of cycles of the engine since the release of the suspension of the fuel supply.

11 Claims, 7 Drawing Sheets

(56) References Cited

U.S. PATENT DOCUMENTS

| | | | | |
|---|---|---|---|---|
| 2004/0110433 A1* | 6/2004 | Watabe | ............... | F02P 5/1506 |
| | | | | 440/87 |
| 2007/0168109 A1* | 7/2007 | Kaji | ............... | F02D 11/105 |
| | | | | 701/114 |
| 2008/0026653 A1* | 1/2008 | Ito | ............... | B63H 21/21 |
| | | | | 440/84 |
| 2008/0280512 A1* | 11/2008 | Ozaki | ............... | B63H 21/213 |
| | | | | 440/1 |

* cited by examiner

OUTBOARD MOTOR

CROSS-REFERENCE TO RELATED APPLICATIONS

This application is based upon and claims the benefit of priority of the prior Japanese Patent Application No. 2019-229515, filed on Dec. 19, 2019, the entire contents of which are incorporated herein by reference.

BACKGROUND

Field of the Invention

The present invention relates to an outboard motor.

Background Information

There is a type of outboard motor in which fuel reduction is made when an engine becomes an over-revolution state. In the outboard motor, for instance, a controller determines that the engine is in the over-revolution state when the speed of the engine exceeds a threshold. The controller executes fuel reduction when determining that the engine is in the over-revolution state. Accordingly, fuel injection into the engine is suspended whereby the engine speed is lowered. The controller releases suspending fuel supply to the engine when determining that the engine speed has been lowered enough.

SUMMARY

In the outboard motor described above, even when suspending fuel supply is released after fuel reduction, a lean state, in which an air-fuel ratio is higher than usual, continues during several engine cycles. Because of this, even when the fuel is ignited, an engine cycle with low combustion speed is likely to occur, whereby chances are that combustion continues to an intake stroke. When continuing to the intake stroke, combustion works as means for ignition and burns air-fuel mixture taken in the intake stroke. Accordingly, chances are that backfire occurs and combustion sound is heard. It is an object of the present disclosure to inhibit occurrence of backfire in releasing of suspending fuel supply in an outboard motor.

An outboard motor according to a first aspect of the present disclosure includes an engine, a fuel injection device, an ignition device, a driveshaft, a propeller shaft, a sensor and a controller. The engine includes a cylinder, an intake pathway, a piston and a crankshaft. The cylinder contains a combustion chamber. The intake pathway is connected to the combustion chamber. The piston is disposed inside the cylinder. The crankshaft is connected to the piston. The fuel injection device is connected to the intake pathway. The ignition device is connected to the combustion chamber. The driveshaft is connected to the crankshaft and extends in an up-and-down direction. The propeller shaft is connected to the driveshaft and extends in a back-and-forth direction. The sensor detects an engine speed of the engine. The controller is connected to the sensor in a communicable manner. The controller receives a signal indicating the engine speed. The controller determines whether or not the engine is in an over-revolution state based on the engine speed. The controller suspends fuel supply performed by the fuel injection device and ignition performed by the ignition device when determining that the engine is in the over-revolution state. The controller determines whether or not the engine has recovered from the over-revolution state. The controller releases suspending the fuel supply performed by the fuel injection device when determining that the engine has recovered from the over-revolution state. The controller releases suspending the ignition performed by the ignition device in elapse of a predetermined number of cycles of the engine after releasing of suspending the fuel supply performed by the fuel injection device.

An outboard motor according to a second aspect of the present disclosure includes an engine, a first fuel injection device, a first ignition device, a second fuel injection device, a second ignition device, a driveshaft, a propeller shaft, a sensor and a controller. The engine includes a first cylinder, a first intake pathway, a first piston, a second cylinder, a second intake pathway, a second piston and a crankshaft. The first cylinder contains a first combustion chamber. The first intake pathway is connected to the first combustion chamber. The first piston is disposed inside the first cylinder. The second cylinder contains a second combustion chamber. The second intake pathway is connected to the second combustion chamber. The second piston is disposed inside the second cylinder. The crankshaft is connected to the first and second pistons. The first fuel injection device is connected to the first intake pathway. The first ignition device is connected to the first combustion chamber. The second fuel injection device is connected to the second intake pathway. The second ignition device is connected to the second combustion chamber. The driveshaft is connected to the crankshaft and extends in an up-and-down direction. The propeller shaft is connected to the driveshaft and extends in a back-and-forth direction. The sensor detects an engine speed of the engine. The controller is connected to the sensor in a communicable manner. The controller simultaneously executes fuel supply performed by the first fuel injection device and fuel supply performed by the second fuel injection device. The controller receives a signal indicating the engine speed. The controller determines whether or not the engine is in an over-revolution state based on the engine speed. The controller suspends the fuel supply performed by each of the first and second fuel injection devices and ignition performed by each of the first and second ignition devices when determining that the engine is in the over-revolution state. The controller determines whether or not the engine has recovered from the over-revolution state. The controller releases suspending the fuel supply performed by each of the first and second fuel injection devices when determining that the engine has recovered from the over-revolution state. The controller releases suspending the ignition performed by each of the first and second ignition devices in elapse of a predetermined number of cycles of the engine after releasing of suspending the fuel supply performed by each of the first and second fuel injection devices.

A method according to a third aspect of the present disclosure refers to a method of controlling an outboard motor. The outboard motor includes an engine, a fuel injection device, an ignition device, a driveshaft, and a propeller shaft. The engine includes a cylinder, an intake pathway, a piston and a crankshaft. The cylinder contains a combustion chamber. The intake pathway is connected to the combustion chamber. The piston is disposed inside the cylinder. The crankshaft is connected to the piston. The fuel injection device is connected to the intake pathway. The ignition device is connected to the combustion chamber. The driveshaft is connected to the crankshaft and extends in an up-and-down direction. The propeller shaft is connected to the driveshaft and extends in a back-and-forth direction.

The method according to the present aspect includes the following processing. First processing refers to receiving a signal indicating an engine speed. Second processing refers to determining whether or not the engine is in an over-revolution state based on the engine speed. Third processing refers to suspending fuel supply performed by the fuel injection device and ignition performed by the ignition device when it is determined that the engine is in the over-revolution state. Fourth processing refers to determining whether or not the engine has recovered from the over-revolution state. Fifth processing refers to releasing suspending the fuel supply performed by the fuel injection device when it is determined that the engine has recovered from the over-revolution state. Sixth processing refers to releasing suspending the ignition performed by the ignition device in elapse of a predetermined number of cycles of the engine after releasing of suspending the fuel supply performed by the fuel injection device. It should be noted that the order of executing the aforementioned processing is not limited to the above and may be changed.

DETAILED DESCRIPTION OF EMBODIMENTS

Figure 1:
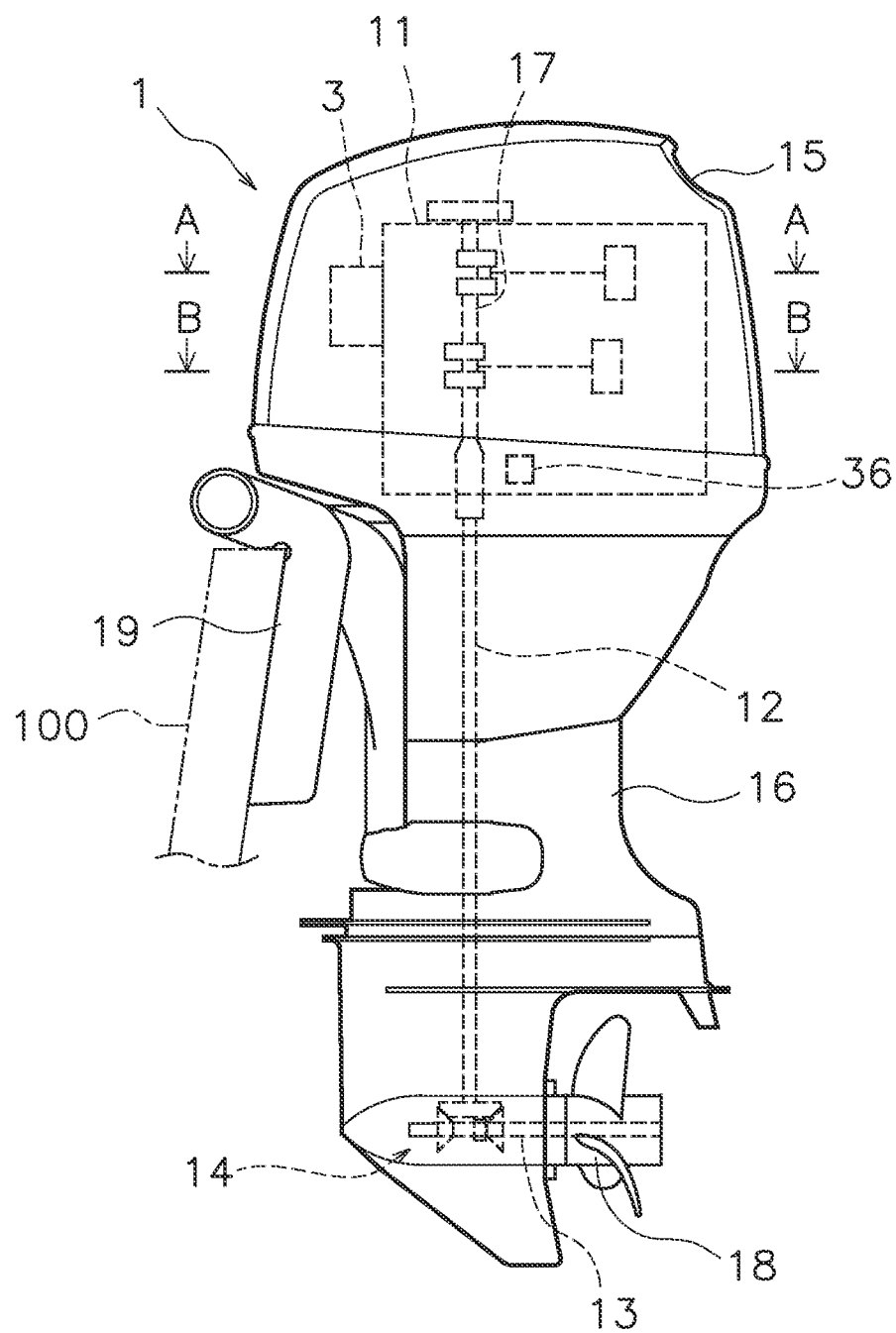
FIG. 1 is a side view of an outboard motor according to an embodiment.

An embodiment will be hereinafter explained with reference to drawings. FIG. 1 is a side view of an outboard motor 1 according to the embodiment. As shown in FIG. 1, the outboard motor 1 is attached to the stern of a boat 100. The outboard motor 1 includes an engine 11, a driveshaft 12, a propeller shaft 13, a shift mechanism 14, a cowl 15 and a housing 16. It should be noted that in the following explanation, front, rear, left, right, up and down directions are defined as meaning the front, rear, left, right, up and down directions of the outboard motor 1, respectively.

The engine 11 generates a thrust for propelling the boat 100. The engine 11 is disposed inside the cowl 15. The engine 11 includes a crankshaft 17. The crankshaft 17 extends in a vertical direction. The driveshaft 12 is connected to the crankshaft 17. The driveshaft 12 extends in an up-and-down direction. The propeller shaft 13 extends in a direction intersecting with the driveshaft 12. The propeller shaft 13 extends in a back-and-forth direction. The propeller shaft 13 is connected to the driveshaft 12 through the shift mechanism 14. A propeller 18 is connected to the propeller shaft 13.

The housing 16 is disposed below the cowl 15. The driveshaft 12 is disposed inside an upper portion of the housing 16. The propeller shaft 13 and the shift mechanism 14 are disposed inside a lower portion of the housing 16. The shift mechanism 14 switches a rotational direction of power to be transmitted from the driveshaft 12 to the propeller shaft 13 between a forward moving direction and a rearward moving direction. The shift mechanism 14 includes, for instance, a plurality of gears and a clutch that changes meshing of the gears. The outboard motor 1 includes a bracket 19. The outboard motor 1 is attached to the boat 100 through the bracket 19.

Figure 2:
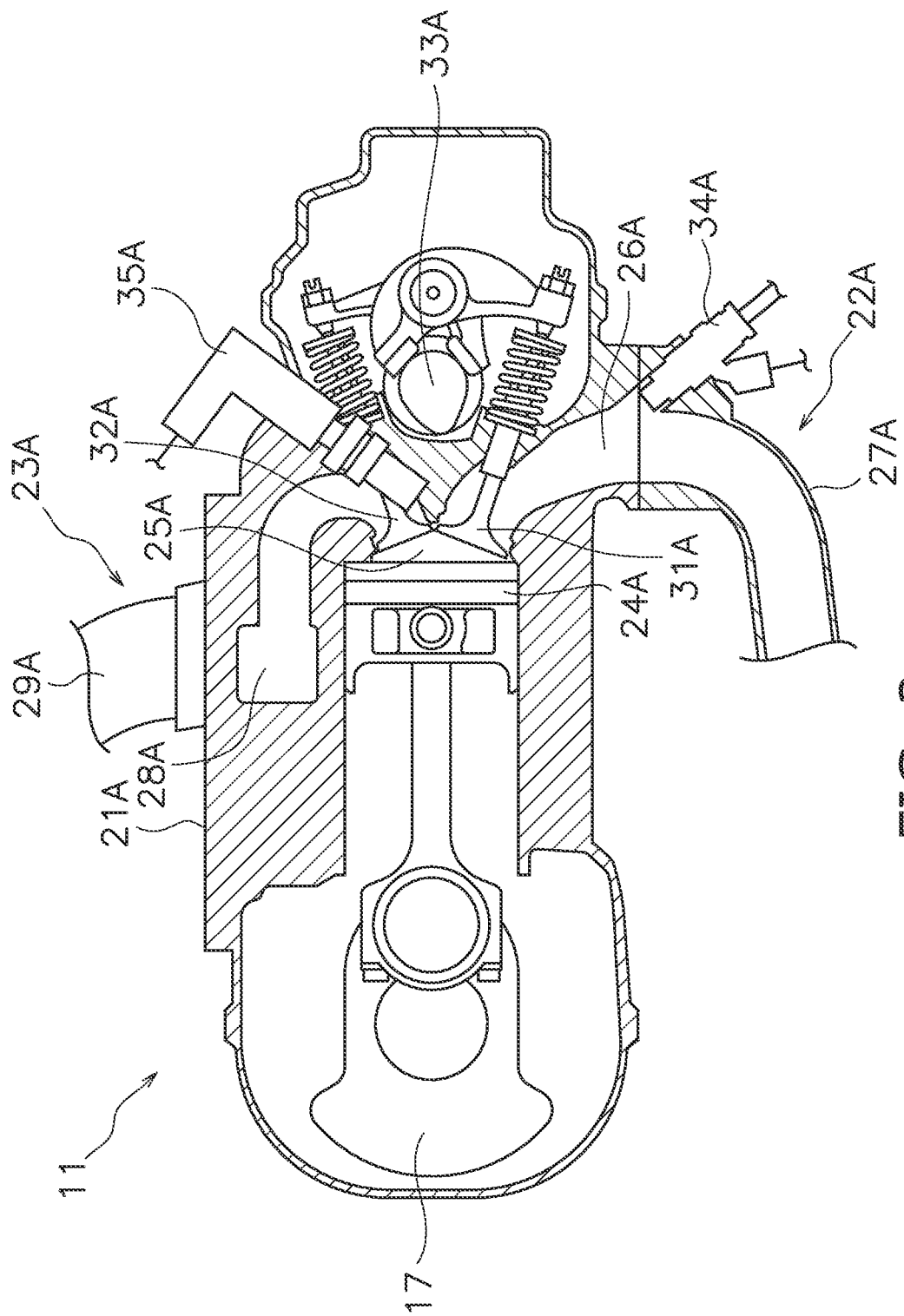
FIG. 2 is a cross-sectional view of an engine taken along line A-A in FIG. 1.

FIG. 2 is a cross-sectional view of the engine 11 taken along line A-A in FIG. 1. As shown in FIG. 2, the engine 11 includes a first cylinder 21A, a first intake pathway 22A, a first exhaust pathway 23A and a first piston 24A. The first cylinder 21A includes a first combustion chamber 25A. The first intake pathway 22A and the first exhaust pathway 23A are connected to the first combustion chamber 25A. The first intake pathway 22A includes a first intake port 26A and a first intake pipe 27A. The first intake port 26A is provided inside the first cylinder 21A. The first intake pipe 27A is connected to the first intake port 26A. The first exhaust pathway 23A includes a first exhaust port 28A and a first exhaust pipe 29A. The first exhaust port 28A is provided inside the first cylinder 21A. The first exhaust pipe 29A is connected to the first exhaust port 28A. The first piston 24A is disposed inside the first cylinder 21A. The first piston 24A is connected to the crankshaft 17.

The engine 11 includes a first intake valve 31A, a first exhaust valve 32A and a first camshaft 33A. The first intake valve 31A opens and closes an opening produced between the first combustion chamber 25A and the first intake pathway 22A. The first exhaust valve 32A opens and closes an opening produced between the first combustion chamber 25A and the first exhaust pathway 23A. The first camshaft 33A is connected to the crankshaft 17 through a cam chain (not shown in the drawings). The first camshaft 33A is rotated in conjunction with rotation of the crankshaft 17. Accordingly, the first camshaft 33A causes the first intake valve 31A and the first exhaust valve 32A to operate.

The engine 11 includes a first fuel injection device 34A and a first ignition device 35A. The first fuel injection device 34A is connected to the first intake pathway 22A. The first ignition device 35A is connected to the first combustion chamber 25A.

Figure 3:
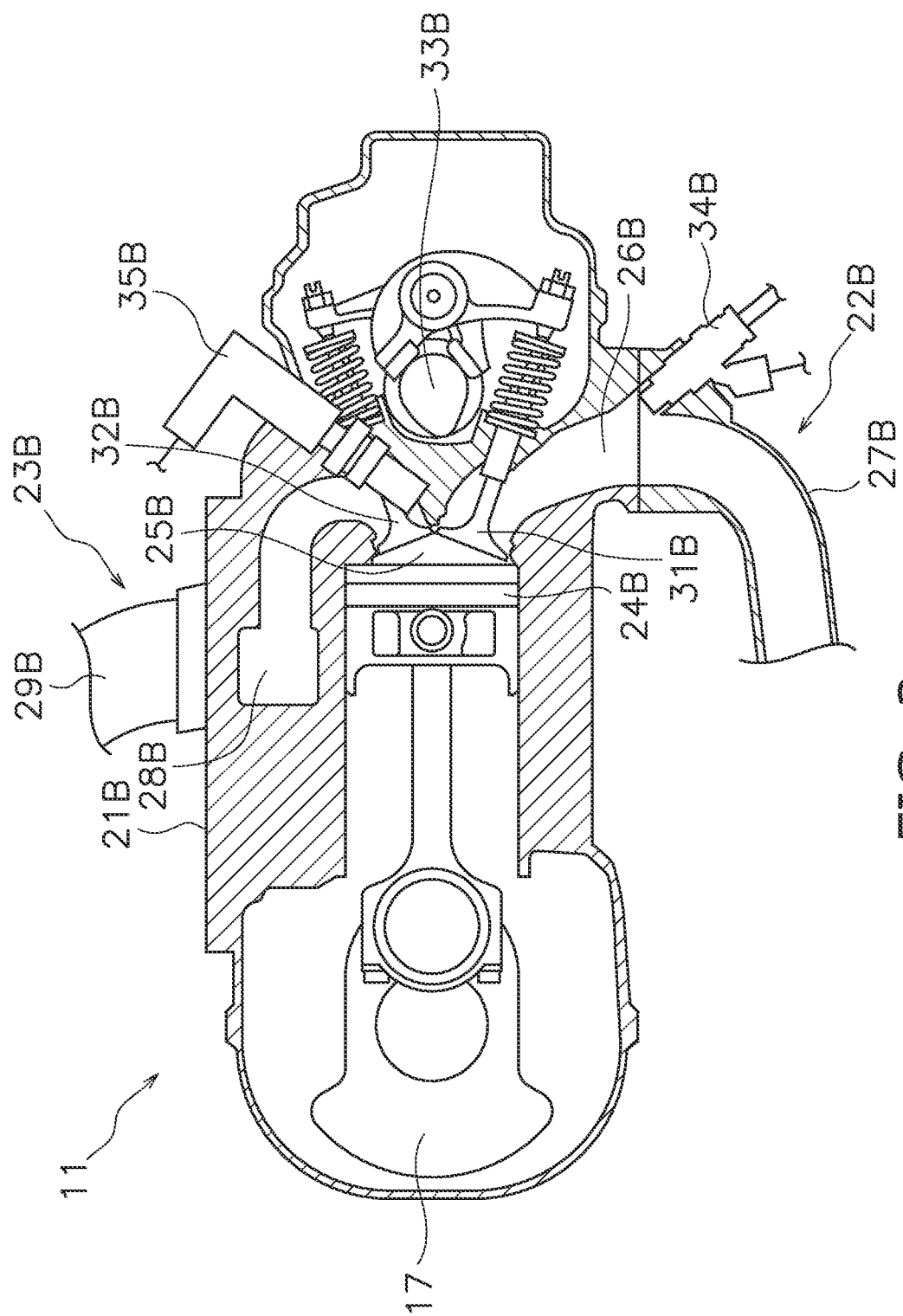
FIG. 3 is a cross-sectional view of the engine taken along line B-B in FIG. 1.

FIG. 3 is a cross-sectional view of the engine 11 taken along line B-B in FIG. 1. As shown in FIG. 3, the engine 11 includes a second cylinder 21B, a second intake pathway 22B, a second exhaust pathway 23B and a second piston 24B. The second cylinder 21B includes a second combustion chamber 25B. The second intake pathway 22B includes a second intake port 26B and a second intake pipe 27B. The second exhaust pathway 23B includes a second exhaust port 28B and a second exhaust pipe 29B. The second cylinder 21B, the second intake pathway 22B, the second exhaust pathway 23B and the second piston 24B are configured in similar manner to the first cylinder 21A, the first intake pathway 22A, the first exhaust pathway 23A and the first piston 24A, respectively. The engine 11 includes a second intake valve 31B, a second exhaust valve 32B and a second camshaft 33B. The second intake valve 31B, the second exhaust valve 32B and the second camshaft 33B are configured in similar manner to the first intake valve 31A, the first exhaust valve 32A and the first camshaft 33A, respectively. The engine 11 includes a second fuel injection device 34B and a second ignition device 35B. The second fuel injection device 34B and the second ignition device 35B are configured in similar manner to the first fuel injection device 34A and the first ignition device 35A, respectively.

Figure 4:
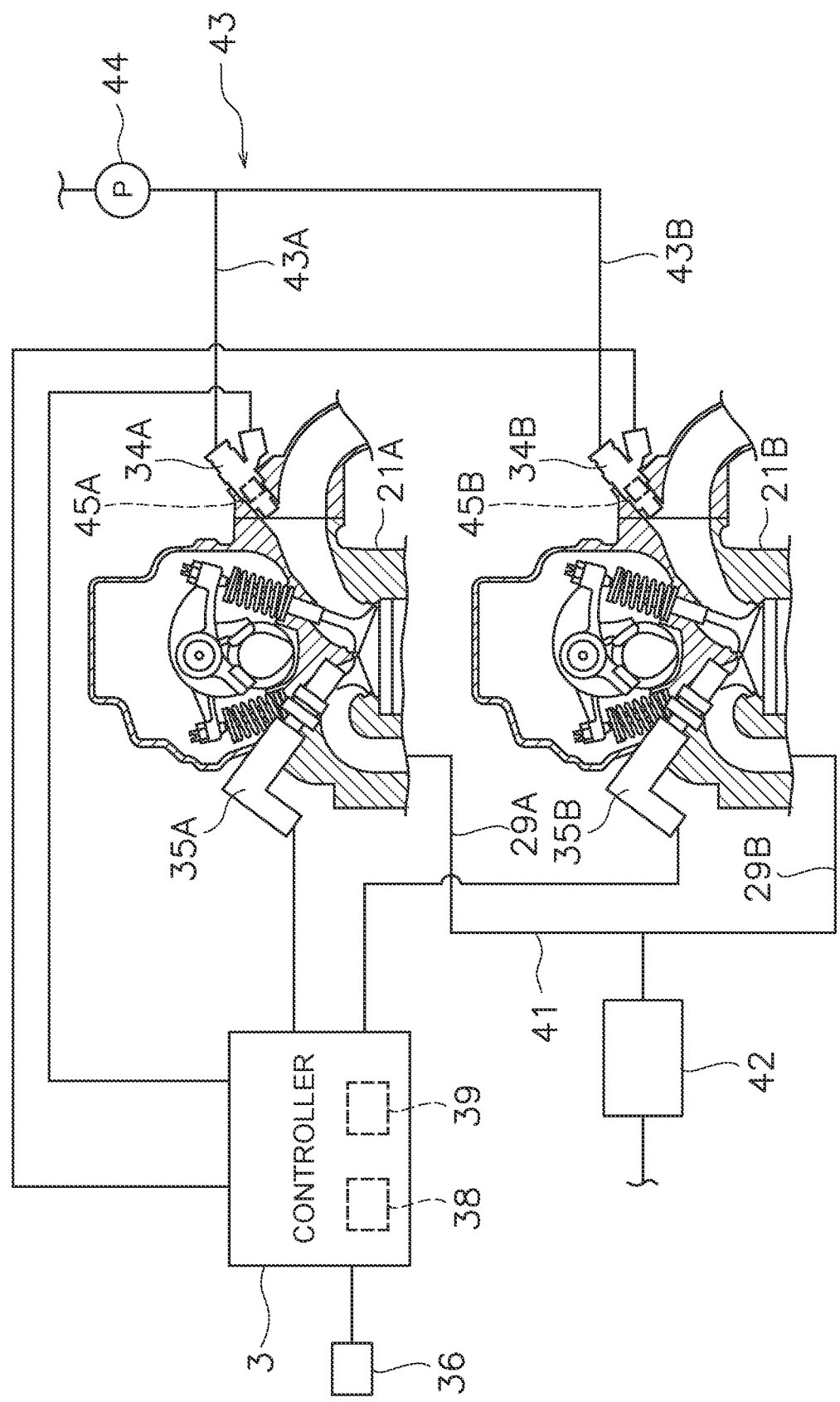
FIG. 4 is a schematic diagram showing a configuration regarding a control system and an intake and exhaust system in the engine.

FIG. 4 is a schematic diagram of a configuration regarding a control system and an intake and exhaust system in the engine 11. As shown in FIG. 4, the outboard motor 1 includes a controller 3. The controller 3 is programmed to electrically control the engine 11. The controller 3 includes a processor 38 and a memory 39. The memory 39 stores a program and data for controlling the outboard motor 1. The memory 39 includes, for instance, a RAM (Random Access Memory) and a ROM (Read Only Memory). The processor 38 is, for instance, a CPU (Central Processing Unit). The processor 38 executes processing for controlling the outboard motor 1 based on the program and data.

The outboard motor 1 includes a rotational speed sensor 36. The rotational speed sensor 36 outputs a signal indicating the rotational speed of the crankshaft 17. The controller 3 is connected to the rotational speed sensor 36 in a communicable manner. The controller 3 receives the signal indicating the rotational speed of the crankshaft 17. For example, the rotational speed sensor 36 outputs a pulse signal indicating a rotational position of a predetermined portion of the crankshaft 17. When receiving pulse signals from the rotational speed sensor 36, the controller 3 computes an engine speed and a crank angle based on the pulse signals and the interval of time therebetween. The controller 3 controls and causes the first fuel injection device 34A to inject the fuel into the first intake pathway 22A. The controller 3 controls the second fuel injection device 34B to inject the fuel into the second intake pathway 22B. The controller 3 controls the first ignition device 35A to ignite the fuel inside the first combustion chamber 25A. The controller 3 controls the second ignition device 35B to ignite the fuel inside the second combustion chamber 25B.

The outboard motor 1 includes an exhaust manifold 41 and a catalyst device 42. The exhaust manifold 41 is connected to the first and second exhaust pipes 29A and 29B. The catalyst device 42 is connected to the exhaust manifold 41. The catalyst device 42 includes, for instance, a three-way catalyst or so forth as a catalyst for purifying exhaust gas.

The outboard motor 1 includes a fuel pathway 43 and a fuel pump 44. The fuel pathway 43 is connected to a fuel tank (not shown in the drawings). The fuel pathway 43 branches into a first fuel pathway 43A and a second fuel pathway 43B. The first fuel pathway 43A is connected to the first fuel injection device 34A. The second fuel pathway 43B is connected to the second fuel injection device 34B. The fuel pump 44 is connected to the fuel pathway 43. The controller 3 controls the fuel pump 44 to supply the fuel to the first and second fuel pathways 43A and 43B.

The first fuel injection device 34A includes a first solenoid valve 45A. The second fuel injection device 34B includes a second solenoid valve 45B. The controller 3 causes the first fuel injection device 34A to inject the fuel into the first intake pathway 22A by controlling the first solenoid valve 45A. The controller 3 causes the second fuel injection device 34B to inject the fuel into the second intake pathway 22B by controlling the second solenoid valve 45B.

Figure 5:
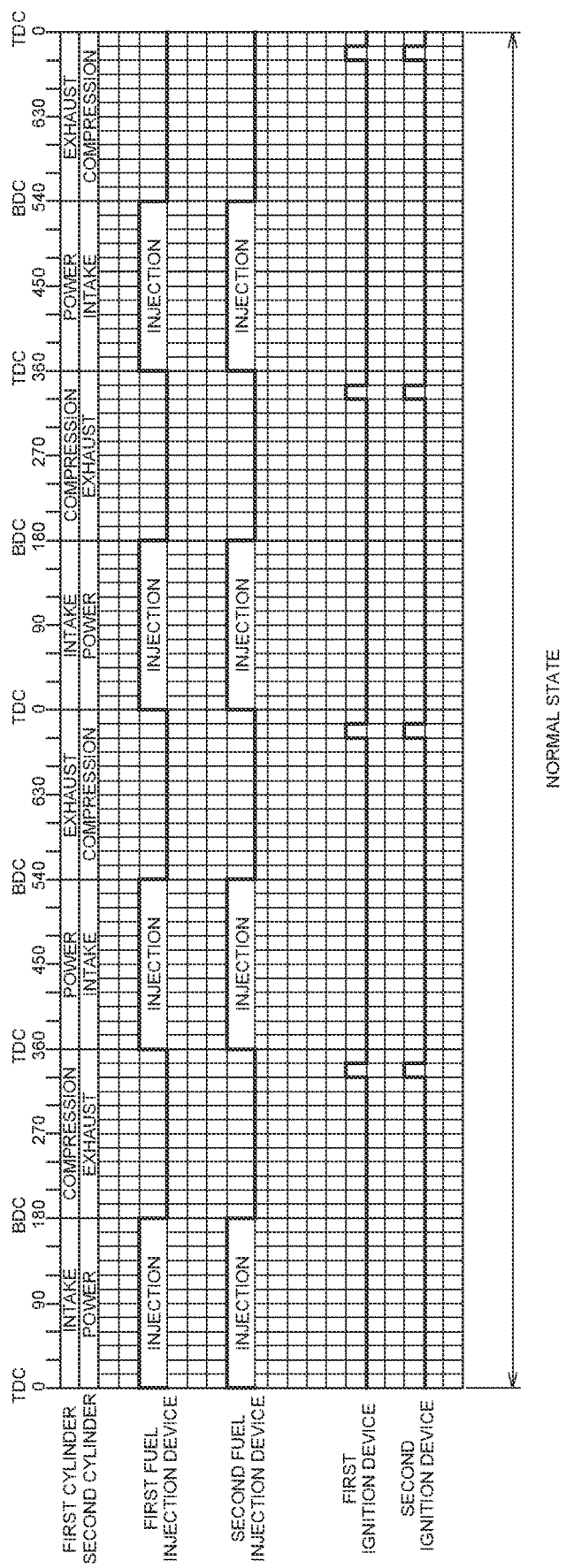
FIG. 5 is a timing chart showing timing of fuel supply and ignition in a normal state of the engine.

The controller 3 controls fuel supply performed by each of the first and second fuel injection devices 34A and 34B and ignition performed by each of the first and second ignition devices 35A and 35B. FIG. 5 is a timing chart showing timing of fuel supply and ignition in a normal state of the engine 11. In FIG. 5, the horizontal axis indicates phase angle of the crankshaft 17. As shown in FIG. 5, phase difference between the first cylinder 21A and the second cylinder 21B is 360 degrees. The engine 11 according to the present embodiment is a so-called 360-degree crank engine.

As shown in FIG. 5, the controller 3 causes the first and second fuel injection devices 34A and 34B to simultaneously perform fuel supply during an intake stroke of the first cylinder 21A and a power stroke of the second cylinder 21B. The controller 3 causes the first and second ignition devices 35A and 35B to simultaneously perform ignition at predetermined timing during a compression stroke of the first cylinder 21A and an exhaust stroke of the second cylinder 21B. Besides, the controller 3 causes the first and second fuel injection devices 34A and 34B to simultaneously perform fuel supply during a power stroke of the first cylinder 21A and an intake stroke of the second cylinder 21B. The controller 3 causes the first and second ignition devices 35A and 35B to simultaneously perform ignition at predetermined timing during an exhaust stroke of the first cylinder 21A and a compression stroke of the second cylinder 21B.

The controller 3 determines whether or not the engine 11 is in an over-revolution state. The controller 3 determines whether or not the engine 11 is in the over-revolution state based on the engine speed of the engine 11. When the engine speed of the engine 11 is greater than or equal to a first threshold, the controller 3 determines that the engine 11 is in the over-revolution state. When the engine speed of the engine 11 is less than the first threshold, the controller 3 determines that the engine 11 is in the normal state. When determining that the engine 11 is in the normal state, the controller 3 executes the aforementioned control configured for the normal state.

Figure 6:
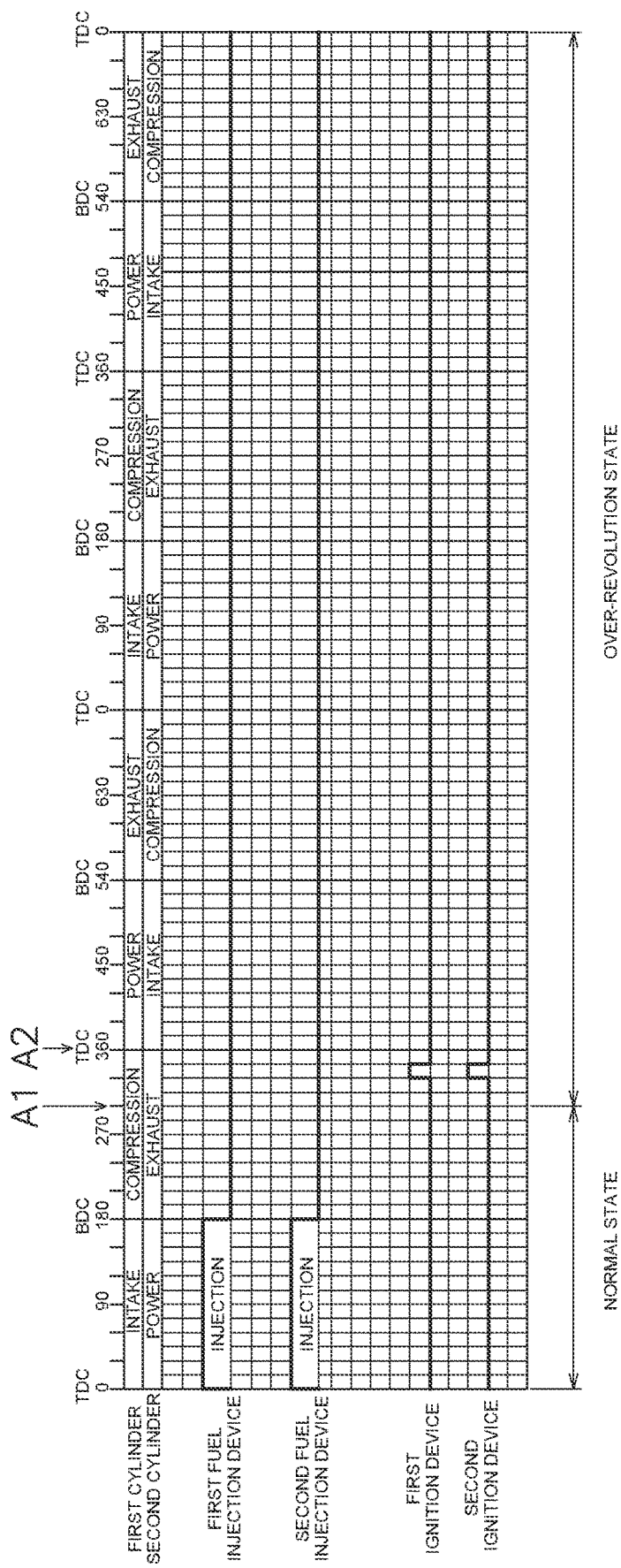
FIG. 6 is a timing chart showing timing of fuel supply and ignition in an over-revolution state of the engine.

FIG. 6 is a timing chart showing timing of fuel supply and ignition in the over-revolution state of the engine. As shown in FIG. 6, the controller 6 determines that the engine 11 is in the over-revolution state at phase A1. In this case, the controller 3 suspends fuel supply performed by each of the first and second fuel injection devices 34A and 34B and ignition performed by each of the first and second ignition devices 35A and 35B at phase A2 and thereafter. The controller 3 determines whether or not the engine 11 has recovered from the over-revolution state during suspending both fuel supply performed by each of the first and second fuel injection devices 34A and 34B and ignition performed by each of the first and second ignition devices 35A and 35B. For example, the controller 3 determines that the engine 11 has recovered from the over-revolution state when the engine speed of the engine 11 becomes less than or equal to a second threshold. The second threshold may be identical to the first threshold. Alternatively, the second threshold may be different from the first threshold.

Figure 7:
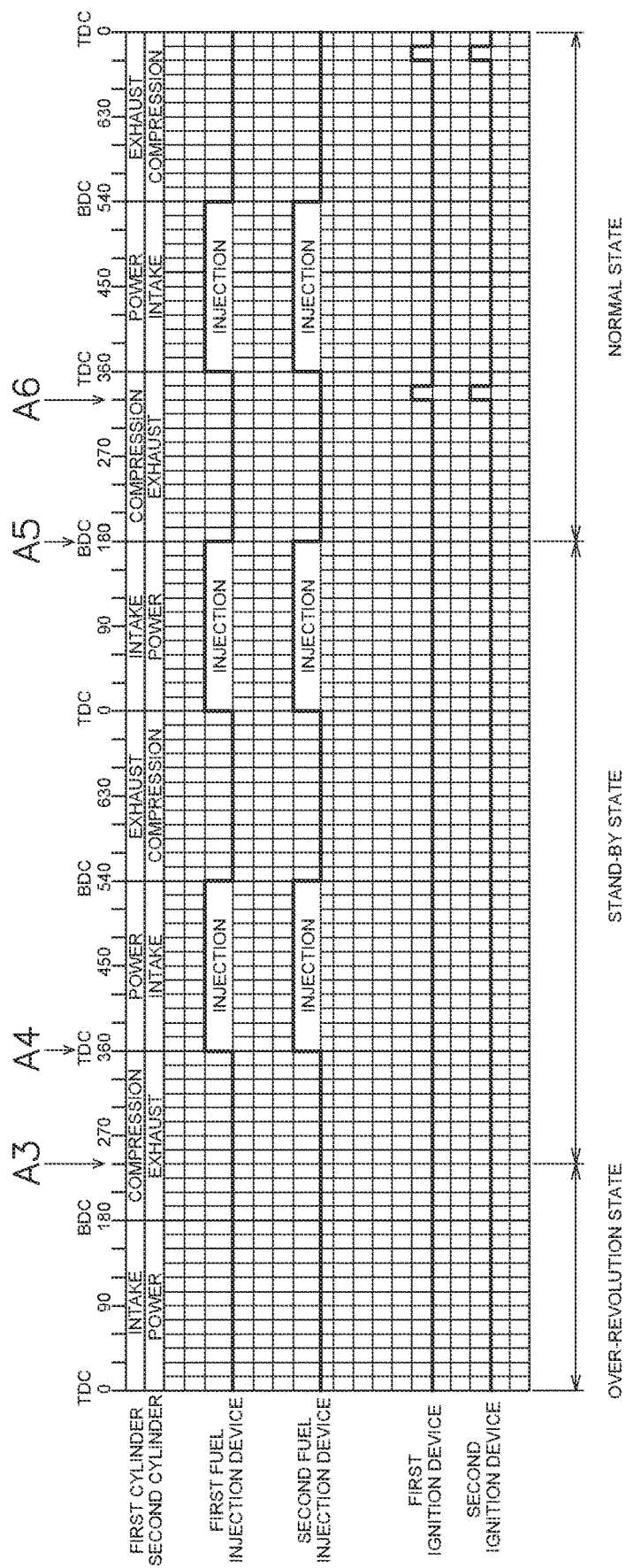
FIG. 7 is a timing chart showing timing of fuel supply and ignition in a stand-by state of the engine.

When determining that the engine 11 has recovered from the over-revolution state, the controller 3 turns the engine 11 to a stand-by state. FIG. 7 is a timing chart showing timing of fuel supply and ignition in the stand-by state of the engine 11. As shown in FIG. 7, the controller 3 determines that the engine 11 has recovered from the over-revolution state at phase A3. The controller 3 releases suspending fuel supply performed by each of the first and second fuel injection devices 34A and 34B at phase A4 and thereafter. In this case, the controller 3 makes fuel supply greater in amount than when the engine 11 is in the normal state. It should be noted that a period of time to inject the fuel in the stand-by state may be longer than that in the normal state.

After releasing of suspending fuel supply performed by each of the first and second fuel injection devices 34A and 34B, the controller 3 determines whether or not number of times of fuel supply performed by each of the first and second fuel injection devices 34A and 34B has reached a predetermined number of times threshold. The predetermined number of times threshold is, for instance, two. However, the predetermined number of times threshold may be less than two or greater than two.

The controller 3 determines that the number of times of fuel supply performed by each of the first and second fuel injection devices 34A and 34B has reached the predetermined number of times threshold at phase A5. The controller 3 releases suspending ignition performed by each of the first and second ignition devices 35A and 35B at phase A6 and thereafter. After releasing of suspending ignition performed by each of the first and second ignition devices 35A and 35B, the controller 3 restores the amount of fuel supply to a value set for the normal state.

In the outboard motor 1 according to the present embodiment explained above, when the number of times of fuel supply reaches a predetermined number of times threshold after releasing of suspending fuel supply, suspending ignition performed by each of the first and second ignition devices 35A and 35B is released. Because of this, occurrence of fuel combustion with a high air-fuel ratio is avoided immediately after releasing of suspending fuel supply. Accordingly, occurrence of backfire can be inhibited.

One embodiment of the present invention has been explained above. However, the present invention is not limited to the aforementioned embodiment, and a variety of changes can be made without departing from the gist of the present invention. For example, the configuration of the outboard motor 1 is not limited to that in the aforementioned embodiment and may be changed. The configuration of the engine 11 is not limited to that in the aforementioned embodiment and may be changed. For example, in the aforementioned embodiment, the engine 11 is a two-cylinder engine. However, the number of cylinders in the engine 11 is not limited to two, and alternatively, may be less than two or greater than two. The configuration of the fuel system in the engine 11 may be changed.

Controlling the engine 11 by the controller 3 is not limited to that in the aforementioned embodiment and may be changed. For example, the timing of fuel supply performed by each of the first and second fuel injection devices 34A and 34B may be changed. The timing of ignition performed by each of the first and second ignition devices 35A and 35B may be changed.

In the aforementioned embodiment, when the number of times of fuel supply performed by each of the first and second fuel injection devices 34A and 34B reaches a predetermined number of times threshold, the controller 3 releases suspending ignition performed by each of the first and second ignition devices 35A and 35B. In other words, in elapse of a predetermined number of cycles of the engine 11 after releasing of suspending fuel supply, the controller 3 releases suspending ignition performed by each of the first and second ignition devices 35A and 35B. The predetermined number of cycles of the engine 11 is set in correspondence to the predetermined number of times threshold. However, the predetermined number of cycles may be variable. For example, the controller 3 may obtain a volumetric efficiency of the engine 11 and determine the predetermined number of cycles in accordance with the obtained volumetric efficiency.

What is claimed is:

1. An outboard motor, comprising:
an engine including
   a cylinder containing a combustion chamber,
   an intake pathway connected to the combustion chamber,
   a piston disposed in the cylinder,
   a crankshaft connected to the piston,
   a fuel injection device connected to the intake pathway, and
   an ignition device connected to the combustion chamber;
a driveshaft connected to the crankshaft, the driveshaft extending in an up-and-down direction of the outboard motor;
a propeller shaft connected to the driveshaft, the propeller shaft extending in a back-and-forth direction of the outboard motor;
a sensor configured to detect an engine speed of the engine; and
a controller communicatively connected to the sensor, the controller being configured to receive a signal indicating the engine speed from the sensor,
   determine whether or not the engine speed is greater than or equal to a predetermined threshold,
   control the fuel injection device to suspend fuel supply and control the ignition device to suspend ignition, upon determining that the engine speed is greater than or equal to the predetermined threshold,
   determine whether or not the engine speed becomes lower than the predetermined threshold,
   control the fuel injection device to release the suspension of the fuel supply upon determining that the engine speed becomes lower than the predetermined threshold, and
   control the ignition device to release the suspension of the ignition after lapse of a number of cycles of the engine since the release of the suspension of the fuel supply.

2. The outboard motor according to claim 1, wherein the controller is further configured to
   obtain a value of volumetric efficiency of the engine, and
   determine the number of cycles in accordance with the value of volumetric efficiency.

3. The outboard motor according to claim 1, wherein the controller is further configured to control the fuel injection device to provide a greater amount of fuel supply when the controller releases the suspension of the fuel supply upon determining that the engine speed becomes lower than the predetermined threshold, than when the controller determines that the engine speed remains lower than the predetermined threshold.

4. The outboard motor according to claim 1, further comprising:
a fuel pathway connected to the fuel injection device; and
a fuel pump connected to the fuel pathway, wherein
the fuel injection device includes an solenoid valve, and
the controller is communicatively connected to the solenoid valve.

5. The outboard motor according to claim 1, wherein
the engine further includes an exhaust pathway connected to the combustion chamber, and
the outboard motor further comprises a catalyst device connected to the exhaust pathway.

6. An outboard motor, comprising:
an engine including
   a first cylinder containing a first combustion chamber,
   a first intake pathway connected to the first combustion chamber,
   a first piston disposed in the first cylinder,
   a second cylinder containing a second combustion chamber,
   a second intake pathway connected to the second combustion chamber,
   a second piston disposed in the second cylinder, a crankshaft connected to the first piston and the second piston,
a first fuel injection device connected to the first intake pathway,
a first ignition device connected to the first combustion chamber,
a second fuel injection device connected to the second intake pathway, and
a second ignition device connected to the second combustion chamber;
a driveshaft connected to the crankshaft, the driveshaft extending in an up-and-down direction of the outboard motor;
a propeller shaft connected to the driveshaft, the propeller shaft extending in a back-and-forth direction of the outboard motor;
a sensor configured to detect an engine speed of the engine; and
a controller communicatively connected to the sensor, the controller being configured to simultaneously control to the first and second fuel injection devices to provide fuel supply,
receive a signal indicating the engine speed from the sensor,
determine whether or not the engine speed is greater than or equal to a predetermined threshold,
control each of the first and second fuel injection devices to suspend the fuel supply thereof, and control each of the first and second ignition devices to control ignition thereof, upon determining that the engine speed is greater than or equal to the predetermined threshold,
determine whether or not the engine speed becomes lower than the predetermined threshold,
control each of the first and second fuel injection devices to release the suspension of the fuel supply thereof, upon determining that the engine speed becomes lower than the predetermined threshold, and
control each of the first and second ignition devices to release the suspension of the ignition thereof, after lapse of a number of cycles of the engine since the release of the suspension of the fuel supply performed by the first injection device and the second fuel injection device.

7. The outboard motor according to claim 6, wherein the controller is further configured to
obtain a value of volumetric efficiency of the engine, and
determine the number of cycles in accordance with the value of volumetric efficiency.

8. The outboard motor according to claim 6, wherein the controller is further configured to release the suspension of the ignition performed by each of the first and second ignition devices when a number of times of the fuel supply performed by the first injection device and the second fuel injection device becomes greater than or equal to two after the release of the suspension of the fuel supply performed by each of the first and second fuel injection devices.

9. A method of controlling an outboard motor, the outboard motor including
an engine including
a cylinder containing a combustion chamber,
an intake pathway connected to the combustion chamber,
a piston disposed in the cylinder,
a crankshaft connected to the piston,
a fuel injection device connected to the intake pathway, and
an ignition device connected to the combustion chamber,
a driveshaft connected to the crankshaft, the driveshaft extending in an up-and-down direction of the outboard motor, and
a propeller shaft connected to the driveshaft, the propeller shaft extending in a back-and-forth direction of the outboard motor,
the method comprising:
receiving a signal indicating an engine speed of the engine from a sensor;
determining whether or not the engine speed is greater than or equal to a predetermined threshold,
suspending fuel supply performed by the fuel injection device and ignition performed by the ignition device, upon determining that the engine speed is greater than or equal to the predetermined threshold,
determining whether or not the engine speed becomes lower than the predetermined threshold,
releasing the suspension of the fuel supply performed by the fuel injection device upon determining that the engine speed becomes lower than the predetermined threshold, and
releasing the suspension of the ignition performed by the ignition device after lapse of a number of cycles of the engine since the release of the suspension of the fuel supply performed by the fuel injection device.

10. The method according to claim 9, further comprising:
obtaining a value of volumetric efficiency of the engine; and
determining the number of cycles in accordance with the value of volumetric efficiency.

11. The method according to claim 10, further comprising:
making the fuel supply performed by the fuel ignition device greater in amount when the suspension of the fuel supply performed by the fuel injection device is released upon determining that the engine speed becomes lower than the predetermined threshold, than when the engine speed remains lower than the predetermined threshold.

* * * * *